US005902984A

United States Patent [19]

Planke

[11] Patent Number: 5,902,984

[45] Date of Patent: May 11, 1999

[54] MERCHANDISE DISPENSING BY EXCHANGE OF SUBSEQUENTLY VALIDATED CARD SYMBOLS FOR ARTICLE

[75] Inventor: Tore Planke, Oslo, Norway

[73] Assignee: Mekatronikk A/S, Fredrikstad, Norway

[21] Appl. No.: 08/809,859

[22] PCT Filed: Sep. 14, 1995

[86] PCT No.: PCT/NO95/00166

§ 371 Date: Apr. 2, 1997

§ 102(e) Date: Apr. 2, 1997

[87] PCT Pub. No.: WO96/12254

PCT Pub. Date: Apr. 25, 1996

[30] Foreign Application Priority Data

Oct. 12, 1994 [NO] Norway .................................... 943849

[51] Int. Cl.[6] .............................. G07F 7/08; G06F 17/60

[52] U.S. Cl. ............................ 235/381; 235/385; 186/56

[58] Field of Search .................................... 235/381, 383, 235/385; 186/55, 56

[56] References Cited

U.S. PATENT DOCUMENTS

| | | | |
|---|---|---|---|
| 3,741,345 | 6/1973 | Saridis | 186/55 |
| 3,746,130 | 7/1973 | Bullas | 186/56 |
| 3,824,544 | 7/1974 | Simjian | 235/381 |
| 3,870,135 | 3/1975 | Allen . | |
| 3,939,952 | 2/1976 | Schuller et al. . | |
| 4,645,036 | 2/1987 | Nestler | 186/55 |
| 4,669,596 | 6/1987 | Capers et al. . | |
| 4,767,917 | 8/1988 | Ushikubo . | |
| 5,133,441 | 7/1992 | Brown . | |
| 5,186,281 | 2/1993 | Jenkins | 186/55 |

FOREIGN PATENT DOCUMENTS

| | | |
|---|---|---|
| 0 135 631 | 4/1985 | European Pat. Off. . |
| WO 88/04433 | 10/1988 | WIPO . |
| 94/01838 | 1/1994 | WIPO . |

*Primary Examiner*—Donald Hajec
*Assistant Examiner*—Drew A. Dunn
*Attorney, Agent, or Firm*—Browdy and Neimark

[57] ABSTRACT

A system for the sale of consumer goods, where the purchase of an article, from a board (1) containing symbols of merchandise, collects symbols of articles (2) in the form of optically, magnetically or electronically readable cards (2). The card is preprogrammed, but not capable of being reprogrammed. A control unit (3) converts the article number of the card to an article price paid by the customer of the article, and transmits at least one unique serial number of the card via a connection (9; 15) to a comparator and controller unit (10) in a merchandise dispensing machine (11) to be stored as a validation signal for the specific card in a memory (13). The stored validation signal is compared with data on the card which is input and read (16) in the dispensing machine (11), the specific article being dispensed at the correspondence of said data, simultaneously with the validation of the card being deleted.

6 Claims, 1 Drawing Sheet

MERCHANDISE DISPENSING BY EXCHANGE OF SUBSEQUENTLY VALIDATED CARD SYMBOLS FOR ARTICLE

BACKGROUND OF THE INVENTION

1. Technical Field of the Invention

The present invention relates to a system for the sale of consumer goods, where the purchaser of an article at the place of purchase collects one or more non-validated card symbols of the article, where data carried on the symbol of the article are read and registered, where such data are converted to a price for the article which is paid by the purchaser of the article, where the purchaser of the article receives a validated symbol of the article, and where the article is dispensed to the purchaser at a dispensing location in return for his/her depositing the validated symbol of the article, the symbol of the article subsequently being invalidated, 2. Prior Art Such a system is known from, inter alia, the furniture company IKEA.

The known system is based on a purchaser of an article collecting at a place of purchase the non-validated symbol of the article at one of the many service areas found at the place of purchase. When the customer receives this non-validated symbol of the article, the customer simultaneously knows that the article is reserved for him/her in the stock room. When the customer presents the symbol of the article at the check-out register, this symbol, generally in the form of a large card where the article is described, is read either manually followed by manual typing on the cash register, or by optical reading of a code on the card, for example a bar code. The code for the particular article is converted by a computer system to an article price, which is added to the bill that is to be paid in cash by the customer. Only when the article or articles have been paid, will the customer receive a validated symbol of the article. Simultaneously, a message is automatically transmitted to the stock room indicating that the customer has bought and paid for a particular article, so that the customer will receive the article when he/she visits the stock room At the same time the validated symbol of the article, for example a cash register receipt with a special note, is invalidated by the person delivering the article, by a cancellation stamp being placed on the receipt.

EP-A-135,631 teaches a system for the sale of consumer goods, where there is used a programmable card which at a sale is provided with information about the article to be delivered After the article has been delivered, the information on the card is deleted. However, the system may easily be cheated by means of card copies being made.

Other examples of prior art within the patent literature to be mentioned are U.S. Pat. Nos. 4,669,596, 3,870,135, 4,767,917, 5,133,441, 3,939,952 and WO 88/04433.

However, within the grocery trade there is another problem which is of great concern, that is, the steadily increasing problem of theft or pilfering of cigarettes and tobacco goods. Particularly in the case of larcenies, packs of cigarettes and tobacco goods as a whole are a favorite object of thefts. This is due to the fact that tobacco goods are easy to sell, both to handlers of stolen goods and to people in general who often buy single packs or cartons in the streets. On a country-wide basis, the theft of cigarettes and tobacco goods in Norway amounts to values exceeding NOX 100 million per year.

It is often found in cases of theft that the whole of the easily accessible stock of cigarettes and tobacco goods has been taken.

By means of the present invention it is sought to solve this problem which is particularly prevalent within the grocery trade.

Although the present system has been shown and described particularly in connection with the sale of tobacco goods, it will be readily understood that the system easily may be used for the sale of other types of goods, particularly where price and size represent a security risk, for example CD's, Russian caviar, etch According to the invention the system mentioned by way of introduction is characterized by a preprogrammed, not reprogrammable card which is optically, magnetically or electronically readable and which forms the symbol of the article and which contains data both in the form of a number for the article of merchandise and a serial number which is unique to the individual card, a merchandise dispensing machine where articles of merchandise corresponding to said article number are stored, a comparator and controller unit mounted in the merchandise dispensing machine, a card input having a card reader mounted in the merchandise dispensing machine for the input of said readable card and reading the data on the card, a control unit at the place of purchases for example a manually operated cash register, where said data on the symbol of the article are read either by the readable area of the card being scanned by insertion of the card into a scanner device or by data for the card being manually read and loaded into the control unit, transmitting means in the control unit for transmitting a validation signal to and storing it in the comparator/controller unit in the merchandise dispensing machine upon or subsequent to the registration of said article prices said validation signal being composed of at least said serial number, a comparator section of said comparator and controller unit adapted to receive the data read by the card reader and collate these with the data in said validation signal which are stored in the memory of the comparator section, and in the case of correspondence emit an enabling signal to an controller section in said comparator and controller unit, and actuating means for a merchandise dispensing machine adapted to receive an controller signal from said controller section and as a result of the controller signal effect the delivery to the customer of the paid number of articles corresponding to said article number from a merchandise supply in said dispensing machine.

According to the invention, it will also be advantageous to let the comparator section be adapted to delete the used validation signal from the memory of the comparator section, simultaneously with or subsequent to the output of the enabling signal.

In the merchandise dispensing machine a container for the collection of cards will be disposed inwardly of said card input and reader. These collected cards where the validation has been cancelled by deletion of said stored validation signals are intended to be brought back to the place of purchase for repeated use.

According to a further embodiment of the system said card input is adapted to return to the customer cards which have not been validated in advance. This means that no article will be dispensed to the customer from the merchandise dispensing machine unless the card has been registered in the control unit and the validation signal has been transmitted from there to the memory of the comparator section.

Said cards may advantageously be designed to carry a complete or partial representation of the article concerned so as thereby to promote the sale of the article. Such articles may be consumer goods, as, for example, one or more of the following items: packs of cigarettes, cigars, snuff, pipe tobaccos and tobacco for rolling cigarettes, etc.

It will be advantageous to let the merchandise dispensing machine have a modular design, with a specific type of merchandise intended for each module. Further, it will be very advantageous to let the dispensing machine be encompassed by a burglarproof cabinet.

BRIEF DESCRIPTION OF THE DRAWINGS

The invention will now be further explained by reference to the enclosed drawings

DETAILED DESCRIPTION OF THE PREFERRED EMBODIMENT(S) OF THE INVENTION

Figure 1:
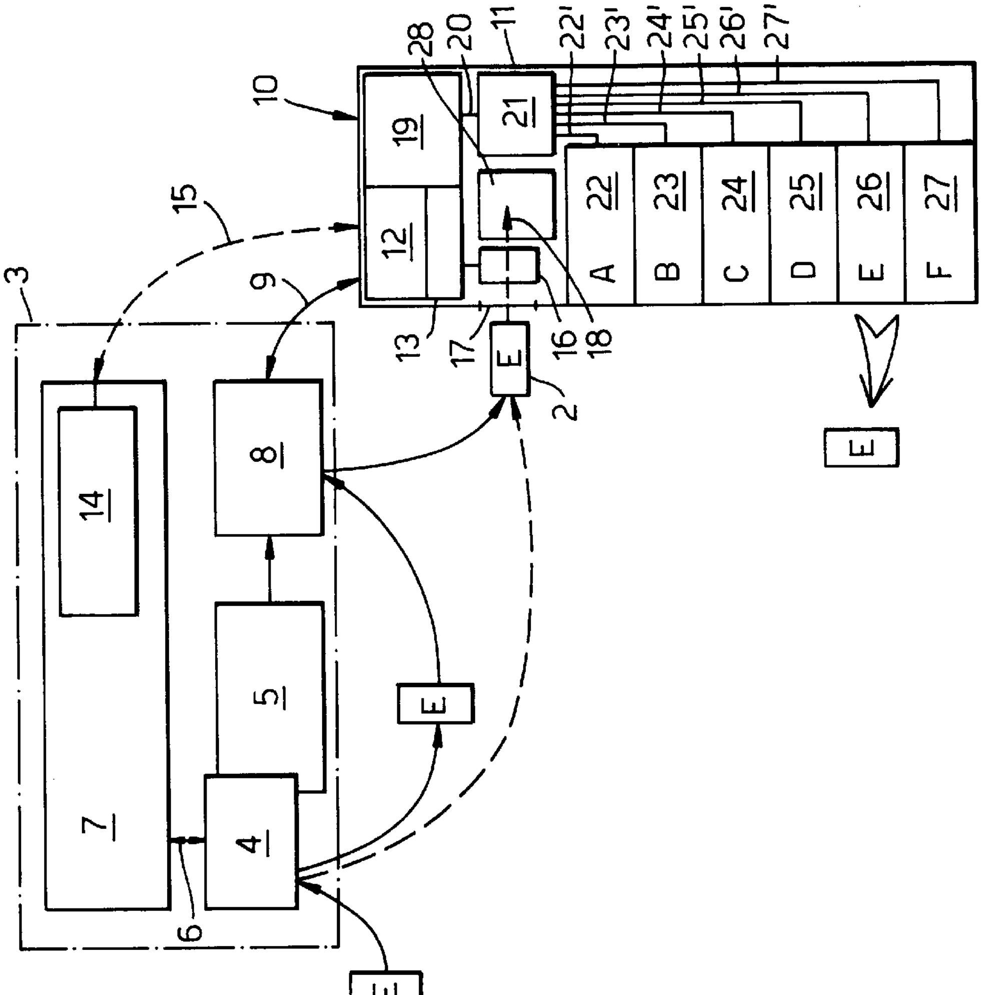
FIG. 1 is a schematic diagram of the system according to the invention.
Figure 1:
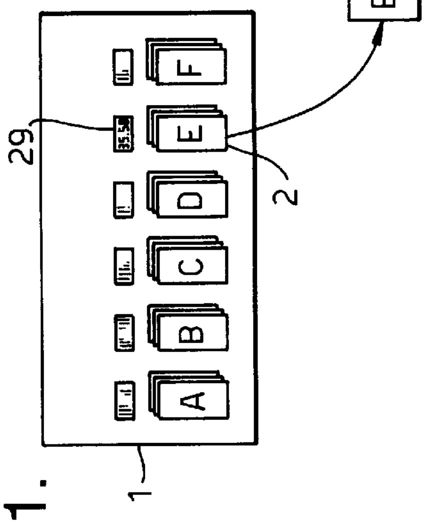

In FIG. 1 there is shown a self-service shelf 1 with symbols 2 of merchandise, where each symbol of merchandise represents a specific article of merchandise. This symbol of an article may be an optically, magnetically or electronically readable card containing data both in the form of a number of an article of merchandise and a serial number which is unique to the particular card. The card is preprogrammed and cannot be reprogrammed. This makes the card inexpensive with respect to its production. Such cards on a self-service shelf may, for example, represent packs of cigarettes of various brands. Thus, when the customer buys merchandise and in the present example also wishes to have one or more packs of cigarettes of a particular brand, he picks up the desired number of cards, The unique serial number of each separate card and the number of the article of merchandise may be disclosed on the card, for example in the form of a bar code, a numerical code, or a magnetic region or in the form of an electronically readable area on the card.

The customer brings the card or possibly a plurality of cards to a control unit 3 at the place of purchase, for example a manually operated cash register. The control unit 3 may consist of a card scanner 4 which scans the reading area of the card. This card scanner 4 may optionally be replaced or supplemented by the usual bar code reader 31 of the cash register. Alternatively, data on the card may be manually read and entered on a keyboard 5 by the person operating the cash register The article number which thus is scanned and manually entered will be transmitted via a connection 6 to a converting means 7 in the control unit 3 in order to convert the merchandise article number which is transferred to the value of the article and register the amount to be paid by the customer for the article, for example NOX 35.50.

However, it will be necessary to ensure that the card 2 for which the customer has paid has been validated. There are therefore, in substance, alternative ways to accomplish this, two of which are being shown in the present description. In the first case the card 2 is moved from the scanner 4 after having been read there, optionally after manual typing via the keyboard 5, to a transmitting means 8 included in the control unit. This transmitting means 8 is capable of transmitting, via a connection 9, a validation signal for the card to a comparator and controller unit 10 included in a merchandise dispensing machine 11, said transmission occurring upon or subsequent to the registration of said amount in the control unit 3 and the converting means 7. The validation signal is composed of at least said unique serial number. The comparator and controller unit 10 comprises a comparator section 12 having a memory 13 where data in said validation signal can be stored.

In an alternative embodiment, indicated by dashed lines, there will, by the scanning of the card 2 in the scanner 4 or by manual registration via the keyboard 5, or by means of the bar code reader 31, occur a transfer to the converting means 7 of both the merchandise article number and the unique serial number of the card. A validation signal is thereafter transmitted from the converting means 7 via another transmitting means 14, this transmitting means 14 being capable of transmitting a validation signal to the comparator section 12 via a connection 15 for the storage of the validation signal in the memory 13 of the comparator section 12. In this case as wells the validation signal will be composed of at least the unique serial number of the card.

Said comparator section of the comparator and controller unit 10 is designed to receives from a card reader 16, data which the card reader reads from a card 2 which is fed through a card input 17 in the merchandise dispensing machine 11 when the card is inserted in the merchandise dispensing machine in the direction of the arrow 18. The comparator section 12 of the comparator and controller unit 10 which receives from the card reader 16 the data read from the card 2 will collate these data with the data stored in the memory 13 for said validation signal. When the data corresponds the comparator section 12 will feed an enabling signal to an controller section 19 which also is included in said comparator and controller unit. The controller unit 19 will as a result of this enabling signal feed a control signal via a connection 20 to an actuating means 21 also included in the merchandise dispensing machine 11. As a result of this controller signal the actuating means 21 will effect the delivery, from a merchandise supply, 22, 23, 24, 25, 26 or 27 in the chosen examples to the customer of the article or articles corresponding to the article numbers to which the respective cards relate. In the present example the customer has taken a card of the type E and, accordingly, this wills at the input of the card 2 in the merchandise dispensing machine 11, and when this card has been prevalidated either via connection 9 or connection 15, entail that an article will be dispensed to the customer from the supply compartment for the article E, viz., the supply compartment 26. The actuating means 21 may be a circuit operating the respective dispensing gates (not shown) of the respective supply compartments 22–27 via respective actuating connections 22', 23', 24', 25', 26' and 27'.

Simultaneously with or subsequent to the output of the enabling signal from the comparator section 12 to the controller section 19, the used validation signal for the respective card will be deleted in the memory 13 of the comparator section 12. This means that when the card 2 is fed past the card reader 16, it will end up in a collection container 28, the card then having lost its validation. The collection container may be disposed directly in the path of movement downstream in relation to the card reader 16, as shown in FIG. 1. By the very fact that the collected cards have had their validation cancelled by the deletion of the stored validation signal for the particular card with its unique serial numbers the collected cards can be brought back to the place of purchase, i.e., the self-service shelf 1 for repeated use, validations and invalidation after the dispensing of the article.

By means of the letters A, B, C, D, E and F it is indicated that the card 2 may carry a complete or partial representation of the articles for example the appearance of a side of a pack of cigarettes.

Although FIG. 1 shows a merchandise dispensing machine 11 having six article type modules, it will be readily understood that the actuating means 21 may equally well operate a greater or smaller number of such modules, depending upon the particular requirements at the place of purchase. The merchandise dispensing machine 11 may expediently be encompassed by a burglarproof cabinets individual articles optionally being described on the exterior of the cabinet. The cabinet ought to be of such strength and structure that it might withstand at least a fifteen minutes' burglary attack without permitting access. This means that the cigarette and tobacco articles located in the store are safely secured in comparison with the known solutions where tobacco articles are placed in a wire cabinet which can easily be broken apart by simple tools.

Although the present invention has been described particularly in connection with consumer goods, as, for example, packs of cigarettes, cigars, snuffs pipe tobaccos tobacco for rolling cigarettes, or similar articles, it is readily understood that the present system also can be used for other consumer goods representing a risk for theft because of their prices size and demand on the market as, for examples compact discs (CD's), Russian caviar, perfume, and so forth.

A further advantage of the present system is that it will not be possible for a customer to input a card which has not been validated in advances the card in that case being returned to the customer. However, this means that a card which might have been copied will not have an article dispensed if the article already has been dispensed for the original card. Such a copied card will be recognized as "false" and retained by the machine.

The greatest advantage of the present invention is that the symbol or symbols of the article cannot be validated before they have been registered in a control unit/cash register. The present system will also be difficult to cheat since the card can be provided with an EAN 13 code permitting a total of $10^{12}$ numerical combinations. The system thus becomes completely theft proof in addition to it being completely impossible to manipulate the card codes in practices these being fixed to the respective card and incapable of being changed. When the merchandise is dispensed, the serial number of the card will, as mentioned, be excluded from the memory 13 and the card will remain within the machine until this is emptied by the staff at the place of purchase. The cards which thus are collected in the collection container 28 are in fact without value and can thereby be used again, provided they are of such a physical quality that this is possible.

The number of units of merchandise for each article of merchandise that can be stored in the merchandise dispensing machine is to a great extent dependent upon the physical design and dimensions of the machine. In a preferred, but for the invention non-limiting, embodiment the dispensing machine may for example have a storage capacity for articles to be dispensed which will be sufficient for two days or more. Further, it is possible to let the merchandise dispensing machine have such a large cabinet that there are opportunities for storage outside the supply compartments, whereby replenishment of the supply compartments might be carried out in a simpler manner.

Although FIG. 1 has been described in particular in connection with a pack of cigarettes, it will be readily understood that somewhat more irregular shapes also may be suitable for delivery from the dispensing machine 11, for example tobacco for rolling cigarettes, canisters for cigars, paper tubes for cigarettes, etc. Although only six variants of articles of merchandise are shown in connection with the self-service shelf 1, this is to be understood simply as an example, the self-service shelf having the symbols of articles or the cards 2 being capable of providing space for far more articles, for example at least 25 variants.

Standard price tickets 29 for shelf use may be placed above each variant of the articles.

Instead of the customer optionally picking up two or more cards in order to receive two or more articles of the same type, some cards on the shelf 1 may for example state the number of articles represented by the card at the same time as the appearance of the article is illustrated on the card.

By means of the present invention there is achieved, not only a safer and simpler sale of consumer goods, such as typically tobacco articles, but also the elimination of a substantial possibility for shrinkage and theft of the articles in question. Not only will the smell of typical tobacco articles be eliminated at the cash register, a smell which is unpleasant both to the customers and the staff, but the customer service at the cash registers will also be better. This, in turn, means a significantly improved work situation for the staff. By the very fact that particularly tobacco goods is a favorite object of theft, the present system will remove a principal catalyst for larcenous motives.

Another essential feature of the present invention is the fact that the tobacco articles will be removed from the cash register area and instead be located in the merchandise dispensing machines, for example at the exit from the store. This will to a much greater extent reduce the so-called "impulse purchase" which often takes place at the cash register. The person operating the cash register will also be spared from having to get up from his/her work place or possibly stretch uncomfortably in order to get hold of the article of merchandise required.

The system also implies, for the reason that the card is preprogrammed with respect to article number and serial number, that the article does not need to be recorded at the cash register and that the card does not have to be programmed or reprogrammed at the cash register. This ensures quick processing at the cash register.

The presence of a self-service shelf also provides the opportunity for marking it with consumer information Similarly, the front of the dispensing machine and the cards 2 might carry consumer information about the particular product. Actually, such information is at the present time only limited to what might be placed on the article in question. As a result of the present system, it will thus be greater opportunities for exposure and campaigns, particularly attitude campaigns in connection with tobacco goods. A more circumstantial buying process will also make the customer more attentive at the moment of purchase.

The present system will not only reduce typical losses due to pilfering, where this constitute nearly 0.5% of the sale of the articles in question, but also possibly lead to less payment in self-insurance in connection with burglary. It is also conceivable that the insurance premium might be reduced as a result of better security arrangements for goods specially exposed to theft.

Moreover, the present system will also result in typical labor saving and better work environment at the individual cash register, in addition to making the maintenance of stock rooms and the replenishing of supplies simpler and more efficient in terms of time.

A modification of the system shown in FIG. 1 can easily be carried out by a person skilled in the art without thereby departing from the spirit of the invention as expressed in the appended patent claims.

Figure 2:
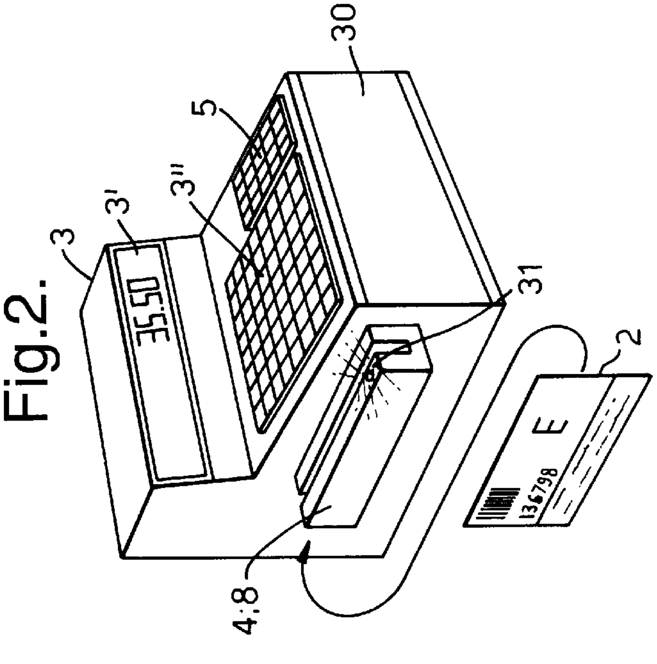
FIG. 2 is a perspective view of a control unit included in the system.

Finally, the invention will briefly be described in connection also with what is shown in FIG. 2. Data from the card 2 can either be read by a scanner 4, as mentioned in connection with FIG. 1, or be entered by means of a keyboard 5. If a keyboard 5 is used, it will in this connection be expedient to provide a transmitting means 8, for example a card scanner, which can transmit the validation signal to the dispensing machine 11. As soon as the validation signal is sent to the dispensing machine 11, a control lamp, for example a LED 31, might be operated on the scanner. In the case where only the scanner is used for sending a validation signal to the dispensing machine via the transmitting means 14, it is only necessary to pass the card 2 through the scanner 4. Normally, the present system will therefore only need one card scanner in addition to the card reader in the dispensing machine itself 11.

The control unit 3 may, for example, have the physical appearance of a cash register with a display window 3' for indicating the value of the article corresponding to the converted merchandise article number. The push-button area 3'' may optionally be used for other cash register functions. The reference numeral 30 represents the box of coins and notes/bills in the register 3, and 31 represents the bar code reader.

I claim:

1. A system for the sale of consumer goods, where the purchaser of an article at a place of purchase collects one or more non-validated card symbol of the article on a readable card, where data carried on the symbol of the article on a readable card are read and registered, where such data are converted to an article price which is paid by the purchaser of the article, where the purchaser of the article receives a validated symbol of the article, and where the article is dispensed to the purchaser at a dispensing location in return for his/her depositing the validated symbol of the article on a readable card, the symbol of the article subsequently being invalidated, said system further comprising:

a merchandise dispensing machine where articles of merchandise corresponding to said article number are stored, a comparator and controller unit mounted in the merchandise dispensing machine, a card input having a card reader mounted in the merchandise dispensing machine for the input of said readable card and reading the data on the card, transmitting means in a control unit for transmitting a validation signal to and storing it in the comparator and controller unit in the merchandise dispensing machine upon or subsequent to the registration of said article price, said validation signal being composed of at least said serial number, a comparator section of said comparator and controller unit, adapted to receive the data read by the card reader and collate these with the data in said validation signal which are stored in the memory of the comparator section, and in the case of correspondence output an enabling signal to an controller section in said comparator and controller unit, and actuating means for a merchandise dispensing machine adapted to receive a controller signal from said controller section and as a result of the controller signal effect the delivery to the customer of the paid number of article corresponding to said article number from a compartment for the supply of merchandise in said dispensing machine, wherein said readable card is a preprogrammed, not reprogrammable card which is optically, magnetically or electronically readable, which forms the symbol of the article, and which contains data both in the form of a number for the article of merchandise and a serial number which is unique to the individual card, and wherein said control unit is located at the place purchase where said data on the symbol of the article are read either by the readable area of the card being scanned by insertion of the card into a scanner device or by data on the card being manually read and loaded into the control unit.

2. The system according to claim 1, wherein the comparator section is adapted to delete the used validation signal from the memory of the comparator section, simultaneously with or subsequent to the output of the enabling signal.

3. The system according to claim 2 wherein said readable card is collected in the merchandise dispensing machine, each said card after having said validation symbol cancelled, being brought back to the place of purchase for repeated use.

4. The system according to one or more of claim 1, wherein said card is designed to carry a complete or partial representation of the article of merchandise.

5. The system disclosed in claim 1, wherein said consumer goods are selected from the group consisting of: packs of cigarettes, cigars, snuff, pipe tobacco, tobacco for rolling cigarettes, or similar goods.

6. The system according to claim 1, wherein said place of purchase is a manually operated cash register.

* * * * *